(12) United States Patent
Tsai et al.

(10) Patent No.: US 8,885,028 B2
(45) Date of Patent: Nov. 11, 2014

(54) STEREOSCOPIC DISPLAY

(75) Inventors: Meng-chieh Tsai, Hsin-Chu (TW); Chih-wen Chen, Hsin-Chu (TW); Chih-hung Shih, Hsin-Chu (TW); Chih-jen Hu, Hsin-Chu (TW); Ren-wei Liao, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 818 days.

(21) Appl. No.: 12/884,170

(22) Filed: Sep. 16, 2010

(65) Prior Publication Data

US 2011/0148860 A1 Jun. 23, 2011

(30) Foreign Application Priority Data

Dec. 23, 2009 (TW) .............................. 98144605 A (51) Int. Cl.
*G06T 15/00* (2011.01)
*H04N 13/00* (2006.01)
*G02B 27/26* (2006.01)
*H04N 13/04* (2006.01)
*G02B 27/22* (2006.01)
*G09G 3/34* (2006.01)
*G09G 3/00* (2006.01)

(52) U.S. Cl.
CPC ............ *H04N 13/0413* (2013.01); *G02B 27/26* (2013.01); *H04N 13/0497* (2013.01); *G02B 27/2264* (2013.01); *G09G 3/3406* (2013.01); *G02B 27/225* (2013.01); *G09G 3/003* (2013.01); *G09G 2300/023* (2013.01)
USPC ......................................................... 348/51

(58) Field of Classification Search
USPC .................. 345/419; 348/51, 42; 359/465
See application file for complete search history.

(56) References Cited

U.S. PATENT DOCUMENTS

| | | | |
|---|---|---|---|
| 2,301,254 A * | 11/1942 | Carnahan ........................ | 348/57 |
| 5,315,377 A | 5/1994 | Isono et al. | |
| 7,492,514 B2 * | 2/2009 | Hamagishi et al. ........... | 359/465 |
| 7,710,648 B2 * | 5/2010 | Chestak et al. ............... | 359/465 |

(Continued)

FOREIGN PATENT DOCUMENTS

| | | |
|---|---|---|
| TW | 200723197 A | 6/2007 |
| TW | 200832008 A | 8/2008 |

*Primary Examiner* — Y Lee
*Assistant Examiner* — Richard Carter
(74) *Attorney, Agent, or Firm* — WPAT, PC; Justin King (57) ABSTRACT

A stereoscopic display is proposed. A first display zone and a second display zone are displayed based on light for a first light source group, in response to a first data voltage signal fed to the first display zone and the second display zone, and to a second data voltage signal fed to a third display zone. The second display zone and the third display zone are displayed based on light for a second light source group, in response to the second data voltage signal fed to the first display zone, and to the first data voltage signal fed to the second display zone and the third display zone. The first display zone and the second display zone are displayed based on light from the first light source group, in response to the second data voltage signal fed to the first display zone and the second display zone, and to the first data voltage signal fed to the third display zone. The second display zone and the third display zone are displayed based on light from the second light source group, in response to the first data voltage signal fed to the first display zone, and to the second data voltage signal fed to the second display zone and the third display zone.

19 Claims, 7 Drawing Sheets

(56) References Cited

U.S. PATENT DOCUMENTS

| | | |
|---|---|---|
| 2006/0072006 A1 | 4/2006 | Lin et al. |
| 2006/0238545 A1* | 10/2006 | Bakin et al. .................. 345/613 |
| 2007/0103424 A1 | 5/2007 | Huang |
| 2007/0229654 A1* | 10/2007 | Kusuno .......................... 348/51 |

* cited by examiner

STEREOSCOPIC DISPLAY

CLAIM OF PRIORITY

This application claims priority to Taiwanese Patent Application No. 098144605 filed on Dec. 23, 2009.

BACKGROUND OF THE INVENTION

1. Field of the Invention

The present invention relates to a stereoscopic display, and more particularly, to a time-sequential stereoscopic display.

2. Description of Prior Art

Human beings see real-world images using both eyes. Further, the human brain forms so-called 3D images (three-dimensional images) according to differences in spatial distance between two views seen by both eyes from two different angles. A so-called 3D display is designed to create simulations of human visual fields from different angles to help users perceive 3D images when viewing 2D images.

Currently, 3D displays are divided into two kinds. One is auto-stereoscopic displays; the other is stereoscopic displays. Users of auto-stereoscopic displays are able to view 3D images without wearing glasses with a unique structure while ones of stereoscopic displays have to wear specially designed glasses to view 3D images.

The principle of a 3D display of parallax barrier patterns inside auto-stereoscopic displays is that, based on an opaque parallax barrier, users of auto-stereoscopic displays are able to view parallax images with both eyes, and such a parallax produces the third dimension in the brain. The principle of a spatial sequential 3D display is that, a time-irrelevant parallax barrier is employed to let both eyes see two different groups of pixels, and the two groups of pixels are provided with signals from the left and right eyes, respectively. So both eyes can view different images. But, the drawback is that the resolution declines to one-half of the original one. As for the principle of a time sequential 3D display, it is that, a time-manipulating and synchronously-driven-with-display-panel parallax barrier is employed to let both eyes see the same group of pixels at different time points. This group of pixels is supplied with signals of left and right eyes at different time points, respectively, to let both eye view different images. However, considering that a single human eye must receive signals of 60 Hz to avoid perceiving flicker, a time sequential 3D display usually requires a frame rate of at least 120 Hz.

Figure 1:
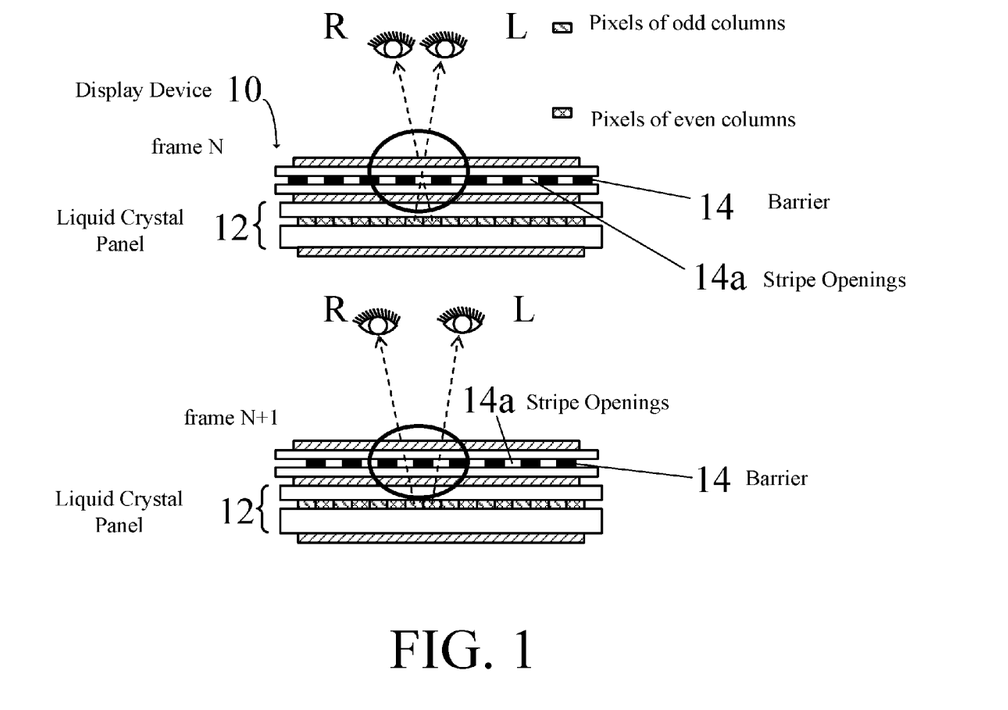
FIG. 1 shows a schematic diagram of a conventional time sequential 3D display device 10.

Referring to FIG. 1 showing a schematic diagram of a conventional time sequential 3D display device 10, the display device 10 comprises a liquid crystal panel 12 and a barrier 14. The liquid crystal panel 12 comprises a pixel matrix. The barrier 14 has multiple stripe openings 14a thereon. With the use of the above-mentioned barrier 14, left-eye and right-eye images are separated, and then the separated images are reflected into a viewer's left eye L and right eye R, respectively. At frame N, pixels of odd columns are displayed based on left-eye signals, while pixels of even columns are displayed based on right-eye signals. At this time, the order of the left-eye and right-eye signals labels LR, and the barrier 14 operates in LR mode. While at frame N+1, pixels of odd columns are displayed based on right-eye signals, while pixels of even columns are displayed based on left-eye signals. At this time, the order of the right-eye and left-eye signals labels RL, and the barrier 14 operates in RL mode. Because the liquid crystal panel 12 adopts a row-by-row scanning, column numbers distributed by left- and right-eye signals on the upper part of the liquid crystal panel 12 are different from those distributed on the lower part when the frame of the liquid crystal panel 12 is updated medially. Take FIG. 1 for example, signals received by pixels on the upper part of the liquid crystal panel 12 are in RL mode while signals received by pixels on the lower part are in LR mode. However, if the barrier 14 as a disparity barrier is in motion at the same time, the human eye will receive mixed left- and right-eye signals in the end.

In an effort to avoid the above-mentioned problem, there are two approaches; one is black frame insertion (BFI) and the other is dynamically switching backlight module. The BFI approach proceeds as follows: After a frame where images are displayed according to odd columns with right-eye signals and even columns with left-eye signals is shown, insert a black frame and then another frame where images are displayed according to odd columns with left-eye signals and even columns with right-eye signals. Repetitively, insert a black frame and then another frame where images are displayed according to odd columns with right-eye signals and even columns with left-eye signals. As for dynamic switching backlight module, the method is as follows: When a liquid crystal panel is scanning, the backlight module is turned off. Then the frame will hold its state for a while after finished being scanned, the backlight module will be turned on at this time. Then the liquid crystal panel will continue scanning the next frame, and the backlight module is turned off again. Unfortunately, the two approaches share a common problem; that is, a refresh rate higher than 120 Hz is required (e.g., 240 Hz is needed for the BFI method) in order to retain the human eye receive frames at 60 Hz. This will produce additional power consumption and increase design complexity.

SUMMARY OF THE INVENTION

It is therefore an object of the present invention to provide a three-dimensional display device where a liquid crystal panel includes at least three display zones and two light sources. Each display zone displays images in different time sequences according to different light sources in order to solve the problem described above.

According to the present invention, a stereoscopic display for showing a three dimension image, comprises a first light source group for generating first light in response to a first enabling signal; a second light source group for generating second light in response to a second enabling signal; a display unit comprising a first display zone, a second display zone, and a third display zone, each display zone for showing an image in response to a first data voltage signal or a second data voltage signal, based on the first light or the second light; and a barrier comprising a first shielding unit and a second shielding unit, the first shielding unit enabling in response to a first shielding signal and the second shielding unit enabling in response to a second shielding signal. When all conditions of the first display zone and the second display zone receiving the first data voltage signal, the third display zone receiving the second data voltage signal, the first shielding unit enabling in response to the first shielding signal, and the first light source group turning on in response to the first enabling signal to generate the first light occur, the first and second display zones show the image based on the first light. When all conditions of the first display zone receiving the second data voltage signal, the second display zone and the third display zone receiving the first data voltage signal, the first shielding unit enabling in response to the first shielding signal, and the second light source group turning on in response to the second enabling signal to generate the second light occur, the second and third display zones show the image based on the second light. When all conditions of the first display zone and the second display zone receiving the second data voltage signal, the third display zone receiving the first data voltage signal, the second shielding unit enabling in response to the second shielding signal, and the first light source group turning on in response to the first enabling signal to generate the first light occur, the first and second display zones show the image based on the first light. When all conditions of the first display zone receiving the first data voltage signal, the second display zone and the third display zone receiving the second data voltage signal, the second shielding unit enabling in response to the second shielding signal, and the second light source group turning on in response to the second enabling signal to generate the second light occur, the second and third display zones show the image based on the second light.

In one aspect of the present, a frequency of the first shielding signal or the second shielding signal or the first enabling signal or the second enabling signal equals to one-half of a scan frequency of the stereoscopic display.

According to the present invention, a method of driving a display to show a three dimension image, the display comprising a display unit and a barrier is provided. The display unit comprises a first display zone and a second display zone. The barrier comprises a first shielding unit and a second shielding unit. The method comprises the steps of: providing a first light source group for generating first light and a second light source group for generating second light; when all conditions of the first display zone receiving the first data voltage signal, the second display zone receiving the second data voltage signal, the first shielding unit enabling in response to a first shielding signal, and the first light source group turning on to generate the first light occur, the first display zone show the image based on the first light; when all conditions of the first display zone receiving the second data voltage signal, the second display zone receiving the first data voltage signal, the first shielding unit enabling in response to the first shielding signal, and the second light source group turning on to generate the second light occur, the second display zone show the image based on the second light; when all conditions of the first display zone receiving the second data voltage signal, the second display zone receiving the first data voltage signal, the second shielding unit enabling in response to a second shielding signal, and the first light source group turning on to generate the first light occur, the first display zone show the image based on the first light, and when all conditions of the first display zone receiving the first data voltage signal, the second display zone receiving the second data voltage signal, the second shielding unit enabling in response to the second shielding signal, and the second light source group turning on in response to the second enabling signal to generate the second light occur, the second and third display zones show the image based on the second light.

These and other objects of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENTS

Figure 2:
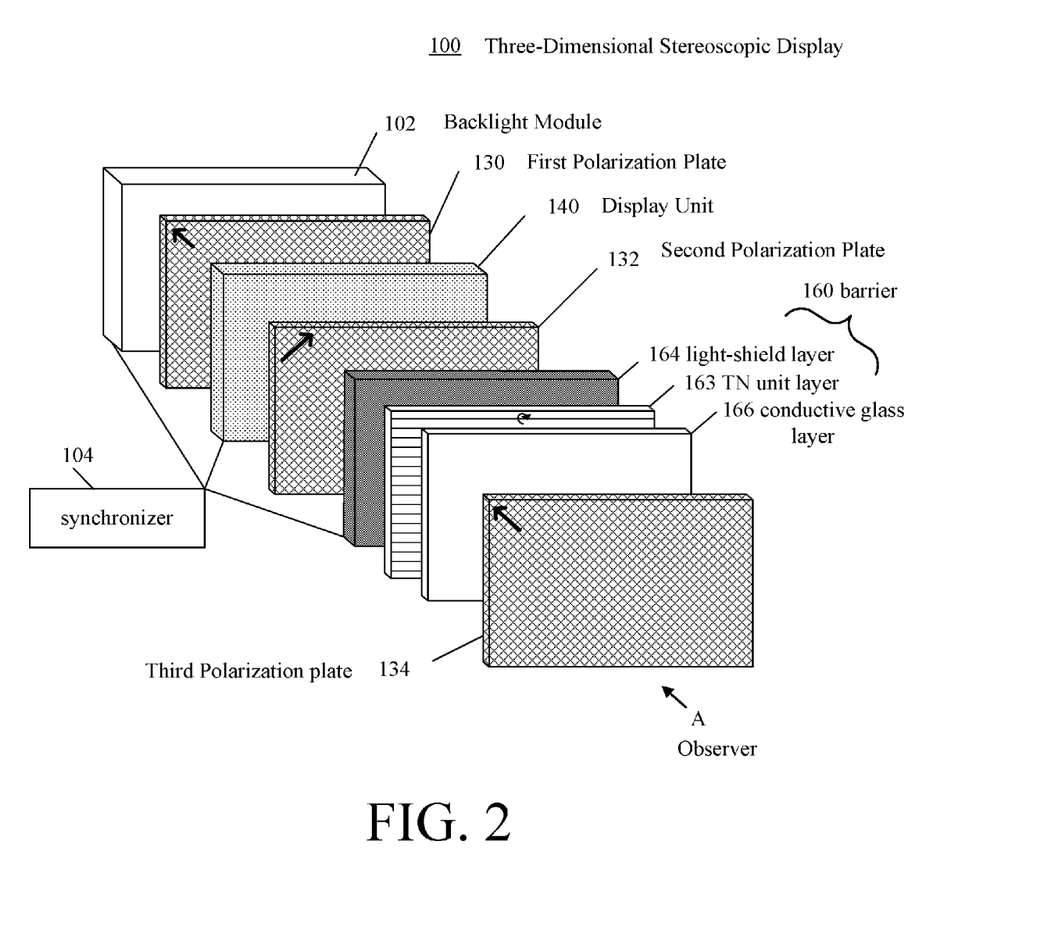
FIG. 2 shows a schematic diagram of a stereoscopic display according to the present invention.

Referring to FIG. 2 showing a schematic diagram of a stereoscopic display 100 of the present invention which displays three-dimensional images, users can view 3D stereoscopic images by using the three-dimensional stereoscopic display 100. The stereoscopic display 100 comprises a backlight module 102, a synchronizer 104, a first polarization plate 130, a display unit 140, a second polarization plate 132, a barrier 160, and a third polarization plate 134. The backlight module 102 comprises a light emitting diode (LED) or a cold cathode fluorescent lamp (CCFL). The display unit 140 can be an LCD panel, which comprises pixel matrixes consisting of a plurality of pixels. The backlight module 102 produces light, which is irradiated to the first polarization plate 130. The first polarization plate 130 is set at about 135 degrees to the polarization axis based upon a view of an observer A, so it allows light complying with the polarization axis of 135 degrees to be transmitted. The second polarization plate 132 is set at about 45 degrees to the polarization axis based upon Observer A, so it allows light complying with the polarization axis of 45 degrees to be transmitted. The third polarization plate 134 is disposed on the light-emitting side of the barrier 160. The third polarization plate 134 is set at about 135 degrees to the polarization axis based upon the observer A, so it allows light complying with the polarization axis of 135 degrees to be transmitted.

Figure 3:
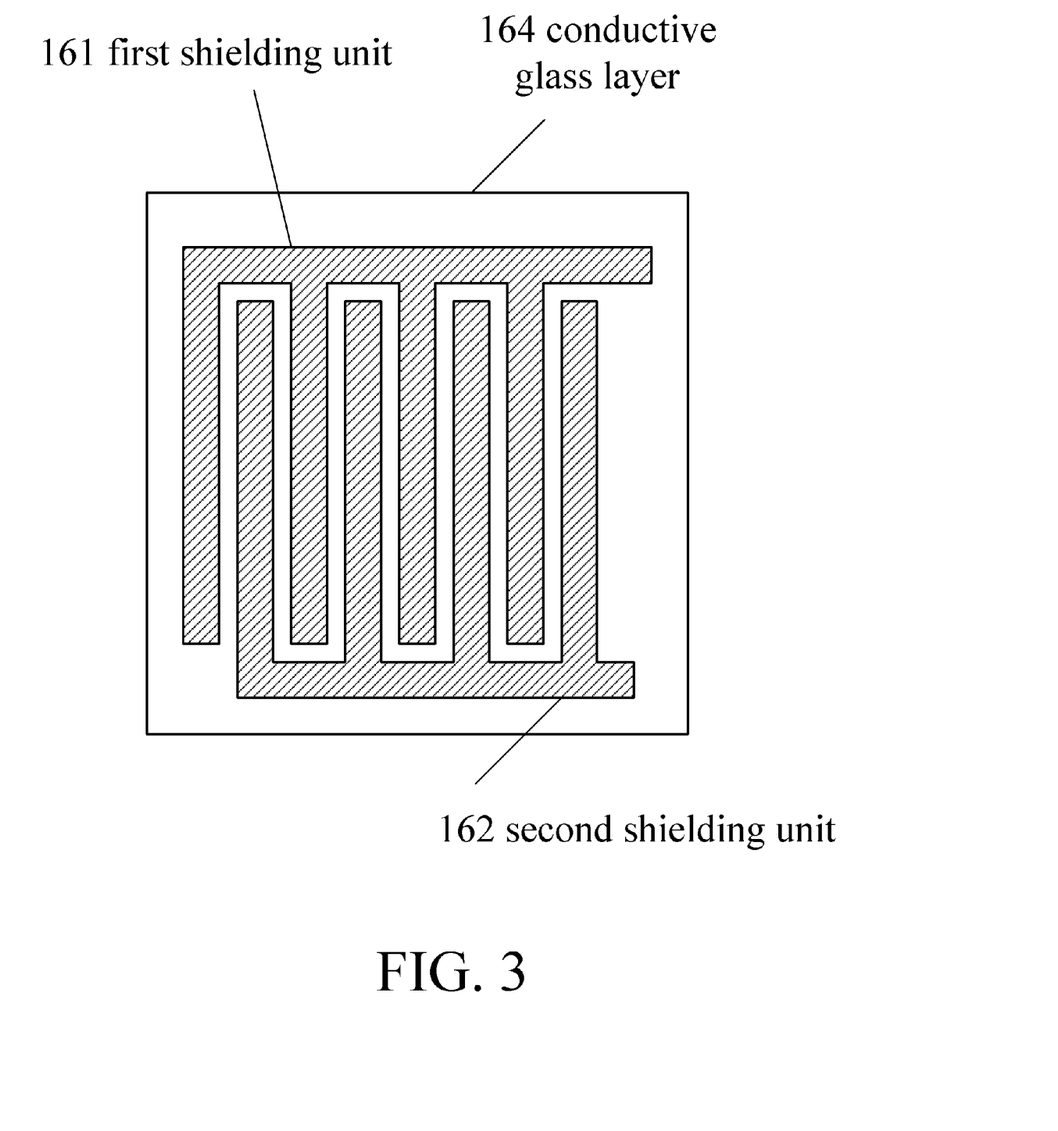
FIG. 3 shows a structure diagram of the barrier in FIG. 2.

Referring to FIG. 3 showing a structure diagram of the barrier 160 in FIG. 2, the barrier 160 comprises a light-shield layer 164, a conductive glass layer 166, and a twisted nematic (TN) layer 130 therebetween. The light-shield layer 164 forms a first shielding unit 161 and a second shielding unit 162, both of which are stripe-shaped. The stripe-shaped first shielding unit 161 and second shielding unit 162 substantially correspond to odd and even columns, respectively. The conductive glass layer 166 is an indium tin oxide (ITO) conductive layer, which is coupled to a common voltage Vcom; the first shielding unit 161 and second shielding unit 162 can be enabled/disabled depending on the first or second shielding signals from the synchronizer 104. For instance, when the first shielding unit 161 receives the first shielding signals whose voltage level V higher than the common voltage Vcom, and meanwhile, the second shielding unit 162 receives the second shielding signals whose voltage level equal to the common voltage Vcom, TN liquid crystal molecules within TN unit layer 163, corresponding to a relative position of the first shielding unit 161, rotate according to the voltage difference between voltage level V applied on the first shielding unit 161 and the common voltage Vcom applied on the conductive glass layer 166. At this time, the first shielding unit 161 is in a state of turning on, rendering the light from the second polarization plate 132 transmit. But meanwhile, because the voltage applied on the second shielding unit 162 equals to the common voltage Vcom applied on the conductive glass layer 166, the second shielding unit 162 is in a state of turning off so that light cannot transmit. On the contrary, when the first shielding unit 161 receives signal whose voltage level equal to the common voltage Vcom, and meanwhile, the second shielding unit 162 receives signal whise voltage level V higher than the common voltage Vcom, the first shielding unit 161 is disabled so that light cannot transmit while the second shielding unit 162 is enabled to let light transmit. Based on the above-mentioned principle, light can be controlled whether to transmit the first shielding unit 161 or to pass through the second shielding unit 162 according to the first or second shielding signals generated from the synchronizer 104. In this way, that the barrier 160 controls images of pixels in odd or even columns in the display unit 140 to be viewed by the human eye can be realized.

Figure 4:
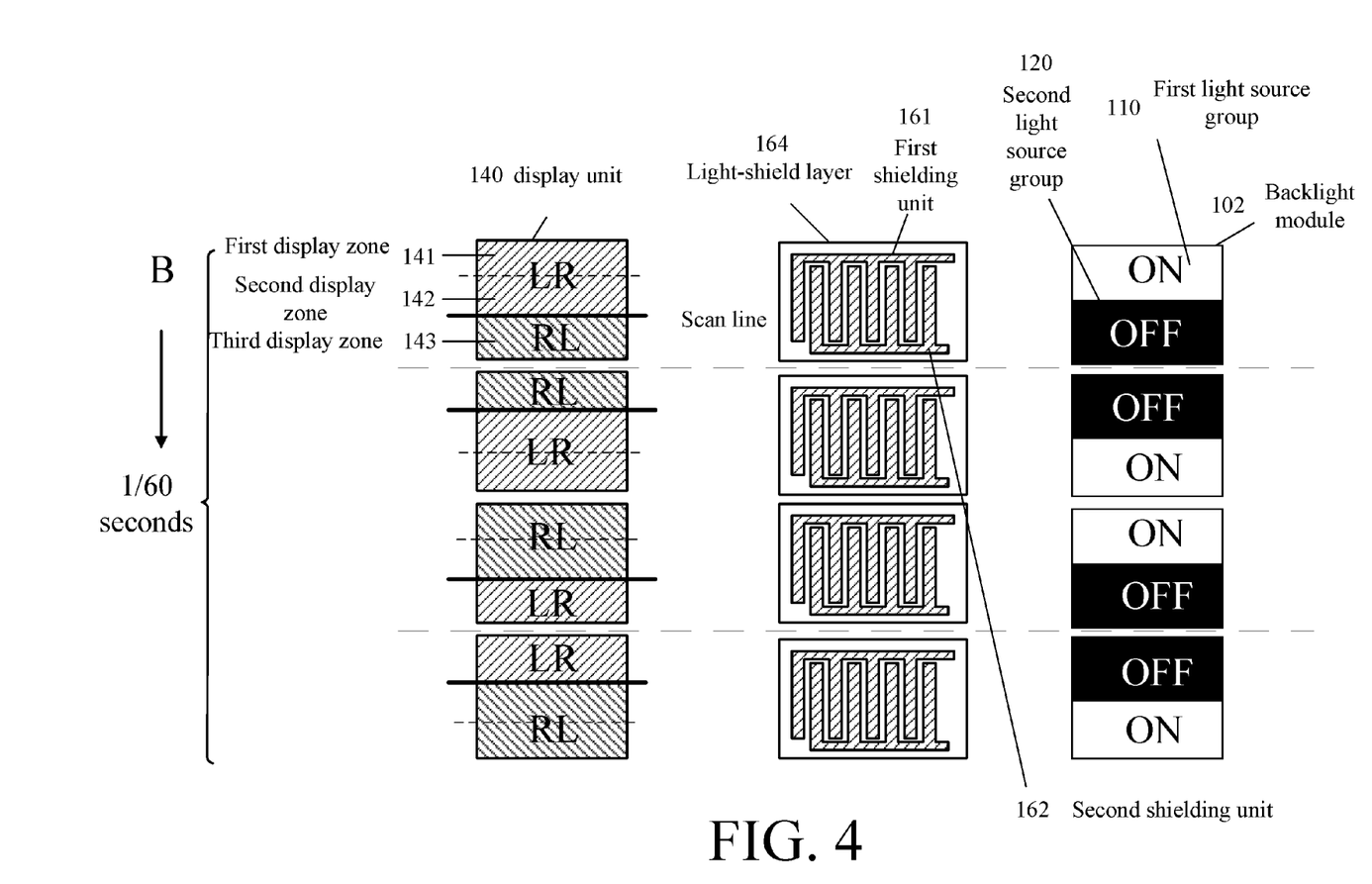
FIG. 4 shows the display unit, the light-shield layer, and the backlight module in motion of the first embodiment of the present invention.

Referring to FIG. 4, FIG. 4 shows the display unit 140, the light-shield layer 164, and the backlight module 102 in motion of the first embodiment of the present invention. The display unit 140 scans along the direction of arrow B in a row-by-row manner until the last row is finished being scanned. The duration of the scan is called a frame rate. Afterwards, the display unit 140 restarts scanning the first row. The embodiment thereinafter is explained based on a frame rate of 120 Hz. It is noted that the frame rate of the display unit 140 can be but not limited to 120 Hz. The backlight module 102 comprises a first light source group 110 and a second light source group 120. Preferably, each of the first light source group 110 and the second light source group 120 cover one-half of the light-emitting area of the backlight module 102. The display unit 140 comprises a first display zone 141, a second display zone 142, and a third display zone 143. Preferably, each of the display zones 141, 142, and 143 cover one-third of the display unit 140. Pixels of odd columns are used to display images according to left-eye signals, and pixels of even columns are used to display images according to right-eye signals, which are defined as first data voltage signals LR. On the contrary, pixels of odd columns are used to display images according to right-eye signals, and pixels of even columns are used to display images according to left-eye signals, which are defined second data voltage signals RL.

Figure 5:
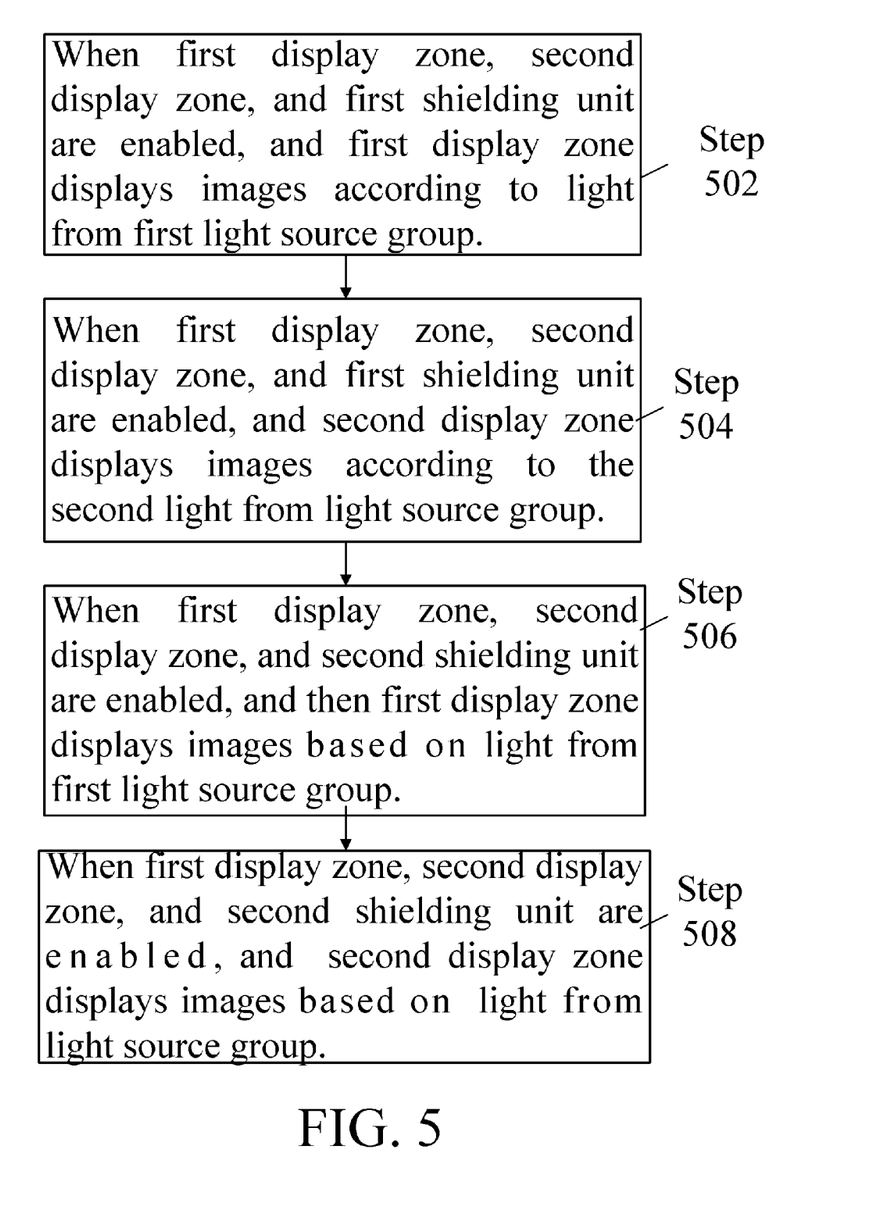
FIG. 5 is a method flowchart of the present invention.

Referring to FIG. 5, FIG. 5 is a method flowchart of the present invention. As Step 502 shows, firstly, the first and second display zones 141 and 142 receive first data voltage signals LR, and the third display zone 143 maintains the second data voltage signals RL corresponding to the previous frame when the second display zone 142 is being scanned. At this time, the first shielding unit 161 of the barrier 160 is enabled in response to first shielding signals, and the first light source group 110 emits first light in response to first enabling signals. Thus, the first and second display zones 141 and 142 display images according to the first light. Meanwhile, because the second light source group 120 is turned off, the images displayed by the third display zone 143 cannot be seen by the human eye due to insufficiency of light though second data voltage signals RL are fed to the third display zone 143.

Subsequently, as Step 504 shows, when the first display zone 141 receives the second data voltage signals RL, and the second and third display zones 142 and 143 receive first data voltage signals LR, the first shielding unit 161 is enabled in response to the first shielding signals, and the second light source group 120 produces second light in response to the second enabling signals. Thus, the second and third display zones 142 and 143 display images according to second light. Meanwhile, because the first light source group 110 is turned off, the images displayed by the first display zone 141 cannot be seen by the human eye due to insufficiency of light though second data voltage signals RL are fed to the first display zone 141.

Afterwards, as Step 506 shows, when the first and second display zones 141 and 142 receive second data the voltage signals RL, and the third display zone 143 receives first data voltage signals LR, the second shielding unit 162 is enabled in response to the second shielding signals, and the first light source group 110 produces first light in response to the first enabling signals. Thus, the first and second display zones 141 and 142 display images according to first light. Meanwhile, because the second light source group 120 is turned off, the images displayed by the third display zone 143 cannot be seen by the human eye due to insufficiency of light though first data voltage signals LR are fed to the third display zone 143.

Finally, as Step 508 shows, when the first display zone 141 receives the first data voltage signals LR, and the second and third display zones 142 and 143 receive second data voltage signals RL, the second shielding unit 162 is enabled in response to the second shielding signals, and the second light source group 120 produces second light in response to the second enabling signals. Thus, the second and third display zones 142 and 143 display images according to second light. Meanwhile, because the first light source group 110 is turned off, the images displayed by the first display zone 141 cannot be seen by the human eye due to insufficiency of light though first data voltage signals LR are fed to the first display zone 141.

It is noted that the frequency of the second enabling signals and the first enabling signals equals to the scan frequency of the display and the frequency of the first shielding signals, and the second shielding signals equals to half of the scan frequency of the display. Take this embodiment for example. The scan frequency of the display is 120 Hz, and that of the first and second shielding signals is 60 Hz and the second and first enabling signals is 120 Hz. The synchronizer 104 synchronously outputs the first and second shielding signals and the second and first enabling signals. In this way, neither will resolution decrease nor will different data voltage signals be shown simultaneously in the display unit 140 when an observer views images displayed by the display unit 140.

Figure 6A:
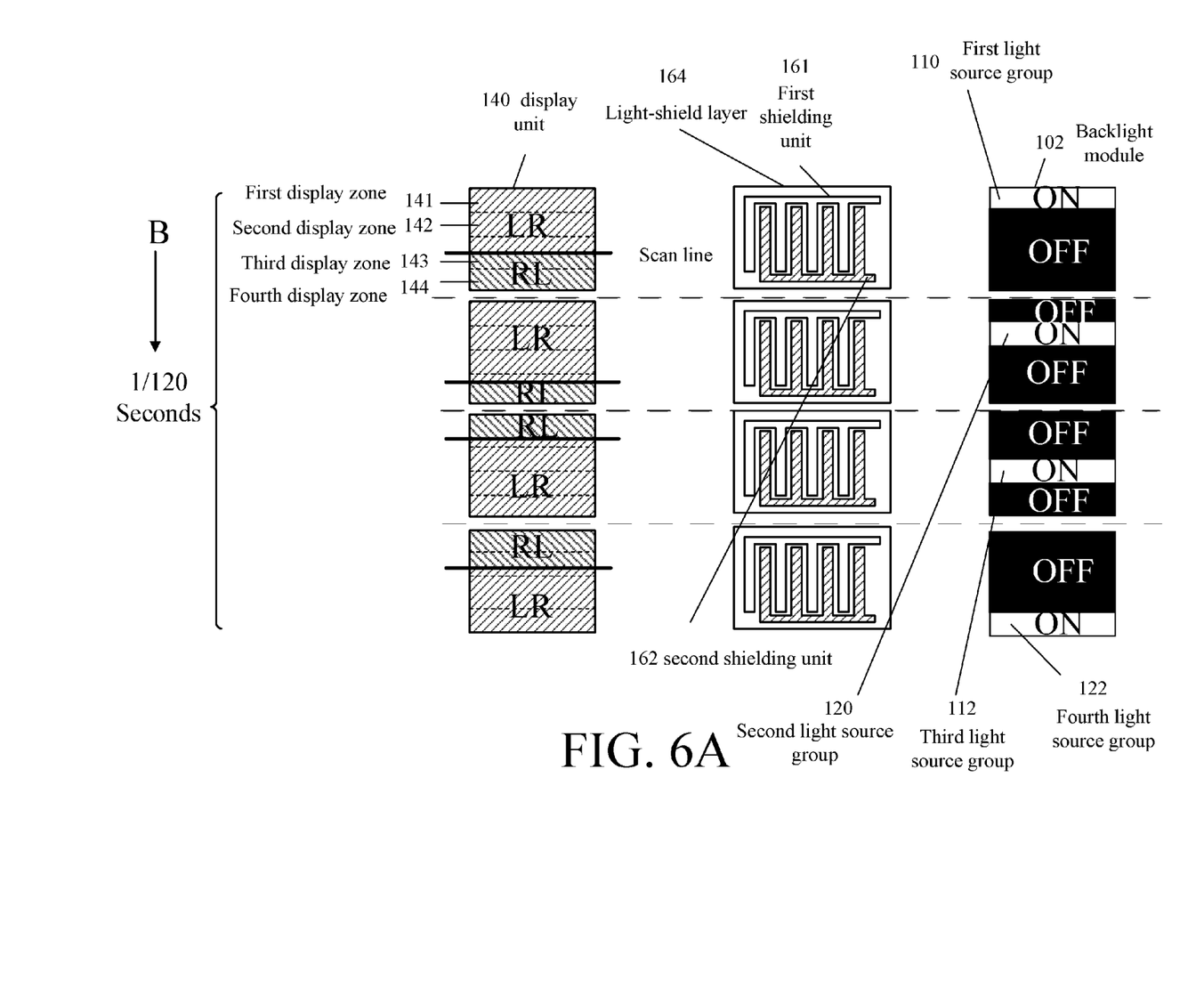
FIGS. 6A and 6B illustrate the display unit, the light-shield layer, and the backlight module in motion of the second embodiment of the present invention.
Figure 6B:
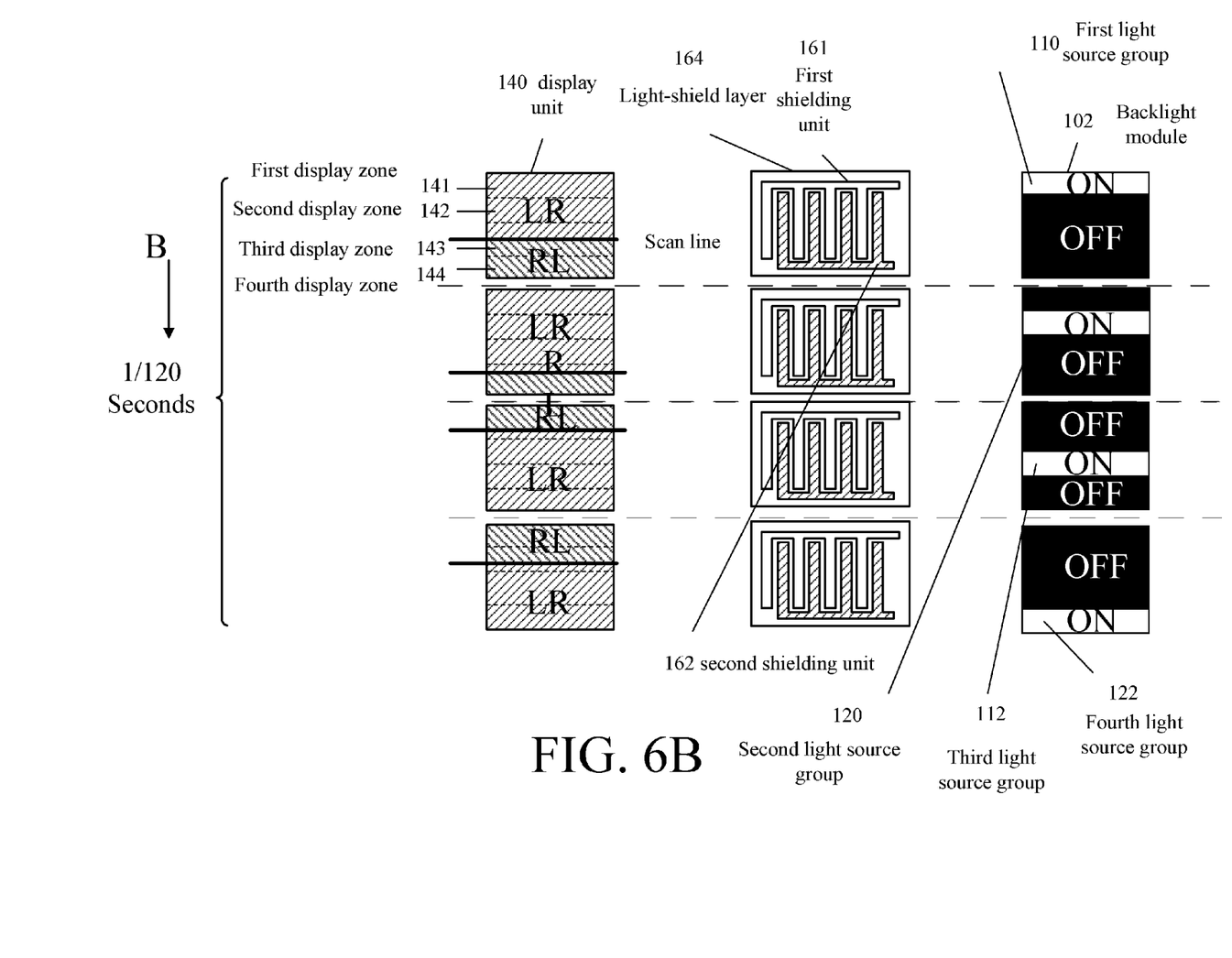

Referring to FIGS. 6A and 6B, FIGS. 6A and 6B illustrate the display unit 140, the light-shield layer 164, and the backlight module 102 in motion of the second embodiment of the present invention. The display unit 140 scans along the direction of arrow B in a row-by-row manner until the last row is finished being scanned. The duration of the scan is called a frame rate. Afterwards, the display unit 140 restarts scanning the first row. The embodiment thereinafter is explained based on a frame rate of 120 Hz. It is noted that the frame rate of the display unit 140 can be but not limited to 120 Hz. The backlight module 102 comprises a first light source group 110, a second light source group 120, a third light source group 112, and a fourth light source group 122. Preferably, each of the first light source group 110, the second light source group 120, the third light source group 112, and the fourth light source group 122 covers one-fourth of the light-emitting area of the backlight module 102. The display unit 140 comprises a first display zone 141, a second display zone 142, a third display zone 143, and a fourth display zone 144. Preferably, each display zones 141, 142, 143, and 144 cover one-fourth of the display unit 140. Pixels of odd columns are used to display images according to left-eye signals, and pixels of even columns are used to display images according to right-eye signals, which are defined as first data voltage signals LR. On the contrary, pixels of odd columns are used to display images according to right-eye signals, and pixels of even columns are used to display images according to left-eye signals, which are defined second data voltage signals RL.

As FIG. 6A shows, firstly, the first and second display zones 141 and 142 receive the first data voltage signals LR, and the third and fourth display zones 143 and 144, part of which has not been scanned yet, maintain second data voltage signals RL corresponding to the previous frame when the third display zone 143 is being scanned. At this time, the first shielding unit 161 of the barrier 160 is enabled (but the second shielding unit 162 is disabled) in response to the first shielding signals, and the first light source group 110 produces first light in response to first enabling signals. Thus, the first display zone 141 displays images according to light of the first light source group 110. Meanwhile, because the light source groups 112, 120, and 122 are turned off, the images displayed by the second, third, and fourth display zones 142, 143, and 144 cannot be seen by the human eye due to insufficiency of light though second data voltage signals RL are received by part of the third and fourth display zones 143 and 144.

Next, the scanning continues downwards. The first, second, and third display zones 141, 142, and 143 receive first data voltage signals LR, and the fourth display zone 144, part of which has not been scanned, maintains second data voltage signals RL corresponding to the previous frame when the fourth display zone 144 is scanned. At this time, the first shielding unit 161 of the barrier 160 is enabled (but the second shielding unit 162 is disabled) in response to first shielding signals, and the second light source group 120 produces light in response to second enabling signals. Therefore, the second display zone 142 displays images according to light of the second light source group 120. Meanwhile, because the light source groups 112, 120, and 122 are turned off, the images displayed by the first, third, and fourth display zones 141, 143, and 144 cannot be seen by the human eye due to insufficiency of light emitted to the first, third, and fourth display zones 141, 143, and 144.

Subsequently, when the first display zone 141 restarts being scanned, the second, third, and fourth display zones 142, 143, and 144 receive first data voltage signals LR, and the first display zone 141 receives second data voltage signals RL. At this time, the first shielding unit 161 of the barrier 160 is enabled (but the second shielding unit 162 is disabled) in response to first shielding signals, and the third light source group 112 produces light in response to third enabling signals. Therefore, the third display zone 143 displays images according to light of the third light source group 112. Meanwhile, because the light source groups 110, 112, and 122 are turned off, the images displayed by the first, second, and fourth display zones 141, 142, and 144 cannot be seen by the human eye due to insufficiency of light.

Afterwards, while the second display zone 142 is scanned, the first display zone 141 receives second data voltage signals RL, the third and fourth display zones 143 and 144 receive first data voltage signals LR, and the first display zone 141 receives second data voltage signals RL. At this time, the first shielding unit 161 of the barrier 160 is enabled (but the second shielding unit 162 is disabled) in response to first shielding signals, and the fourth light source group 122 produces light in response to fourth enabling signals. Therefore, the fourth display zone 144 displays images according to light of the fourth light source group 122. Meanwhile, because the light source groups 110, 112, and 122 are turned off, the images displayed by the first, second, and third display zones 141, 142, and 143 cannot be seen by the human eye due to insufficiency of light.

As shown in FIG. 6B, the first and second display zones 141 and 142 receive the first data voltage signals LR, and the third and fourth display zones 143 and 144, part of which has not been scanned yet, maintain second data voltage signals RL corresponding to the previous frame when the third display zone 143 is being scanned. At this time, the second shielding unit 162 of the barrier 160 is enabled (but the first shielding unit 161 is disabled) in response to the second shielding signals, and the first light source group 110 produces second light in response to the first enabling signals. Thus, the first display zone 141 displays images according to light from the first light source group 110. Meanwhile, because the light source groups 112, 120, and 122 are turned off, the images displayed by the second, third, and fourth display zones 142, 143, and 144 cannot be seen by the human eye due to insufficiency of light though the second data voltage signals RL are fed to the fourth display zone 144 and part of the third display zone 143.

Next, the scanning continues downwards. The first, second, and third display zones 141, 142, and 143 receive first data voltage signals LR, and the fourth display zone 144, part of which has not been scanned, maintains second data voltage signals RL corresponding to the previous frame when the fourth display zone 144 is being scanned. At this time, the second shielding unit 162 of the barrier 160 is enabled (but the first shielding unit 161 is disabled) in response to the second shielding signals, and the second light source group 120 produces light in response to second enabling signals. Therefore, the second display zone 142 displays images according to light of the second light source group 120. Meanwhile, because the light source groups 112, 120, and 122 are disabled, the images displayed by the first, third, and fourth display zones 141, 143, and 144 cannot be seen by the human eye due to insufficiency of light emitted to the first, third, and fourth display zones 141, 143, and 144.

Subsequently, when the first display zone 141 restarts being scanned, the second, third, and fourth display zones 142, 143, and 144 receive first data voltage signals LR, and the first display zone 141 receives the second data voltage signals RL. At this time, the second shielding unit 162 of the barrier 160 is enabled (but the first shielding unit 161 is disabled) in response to the second shielding signals, and the third light source group 112 produces light in response to third enabling signals. Therefore, the third display zone 143 displays images according to light from the third light source group 112. Meanwhile, because the light source groups 110, 112, and 122 are disabled, the images displayed by the first, second, and fourth display zones 141, 142, and 144 cannot be seen by the human eye due to insufficiency of light.

Afterwards, while the second display zone 142 is being scanned, the first display zone 141 receives second data voltage signals RL, the third and fourth display zones 143 and 144 receive first data voltage signals LR, and the first display zone 141 receives second data voltage signals RL. At this time, the second shielding unit 162 of the barrier 160 is enabled (but the first shielding unit 161 is disabled) in response to the second shielding signals, and the fourth light source group 122 produces light in response to fourth enabling signals. Therefore, the fourth display zone 144 displays images according to light from the fourth light source group 122. Meanwhile, because the light source groups 110, 112, and 122 are disabled, the images displayed by the first, second, and third display zones 141, 142, and 143 cannot be seen by the human eye due to insufficiency of light.

It is noted that the frequency of the first shielding signals, the second shielding signals, equals to half of the scan frequency of the display. Take this embodiment for example. The scan frequency of the display is 120 Hz, and that of the first and second shielding signals is 60 Hz. The frequency of turning on each light source groups is also 120 Hz. neither will resolution decrease nor will different data voltage signals be shown simultaneously in the display unit 140 when an observer views images displayed by the display unit 140. Because the brightness distribution constructed by the backlight module 102 at the boundary of every two light source groups lacks a sharp bright-dark contrast; instead, it is successive. In this way, crosstalk occurs when a light region of the backlight module 102 is very close to a scanned display zone. The benefit that the display unit 140 and backlight module 102 are divided into four display zones is that, the distance between a light region of the backlight module 102 and a scanned display zone increases and crosstalk decreases.

The display of the present invention is one display that can exhibit diverse images simultaneously. For example, it can be utilized in stereoscopic displays, which uses binocular disparity, or in displays whose observers on the left and right sides of a display frame can view different images, respectively. More specifically, the display of the present invention can be applied to liquid crystal television sets, liquid crystal displays, plasma displays, overhead projectors, notebook computers, personal digital assistances (PDAs), medical displays, GPS automotive displays, and so on.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A stereoscopic display for showing a three dimension image to a viewer, the stereoscopic display comprising:
    a first light source group for generating first light in response to a first enabling signal;
    a second light source group for generating second light in response to a second enabling signal;
    a display unit comprising a first display zone, a second display zone, and a third display zone, each display zone for showing an image in response to a first data voltage signal or a second data voltage signal, based on the first light or the second light; and
    a barrier comprising a first shielding unit and a second shielding unit, the first shielding unit enabling in response to a first shielding signal and the second shielding unit enabling in response to a second shielding signal,
    wherein the first display zone, the second display zone, and the third display zone respectively comprises a plurality of first pixels and a plurality of second pixels;
    and the first pixels and the second pixels are configured to respectively provide a first right eye image to a right eye of the viewer and a first left eye image to a left eye of the viewer when the first shielding unit enables and the second shielding unit disables in response to the first data voltage signal;
    and the first pixels and the second pixels are further configured to respectively provide a second left eye image to the left eye of the viewer and a second right eye image to the right eye of the viewer when the first shielding unit disables and the second shielding unit enables in response to the second data voltage signal;
    wherein when all conditions of the first display zone and the second display zone receiving the first data voltage signal, the third display zone receiving the second data voltage signal, the first shielding unit enabling in response to the first shielding signal, the second shielding unit disabling, and the first light source group turning on in response to the first enabling signal to generate the first light occur, the first and second display zones show the image based on the first light, but the first pixels of the third display zone does not show the second left eye image to the right eye of the viewer and the second pixels of the third display zone does not show the second right eye image to the left eye of the viewer due to the second light source group not generating the second light,
    when all conditions of the first display zone receiving the second data voltage signal, the second display zone and the third display zone receiving the first data voltage signal, the first shielding unit enabling in response to the first shielding signal, the second shielding unit disabling, and the second light source group turning on in response to the second enabling signal to generate the second light occur, the second and third display zones show the image based on the second light, but the first pixels of the first display zone does not show the second left eye image to the right eye of the viewer and the second pixels of the first display zone does not show the second right eye image to the left eye of the viewer due to the first light source group not generating the first light,
    when all conditions of the first display zone and the second display zone receiving the second data voltage signal, the third display zone receiving the first data voltage signal, the second shielding unit enabling in response to the second shielding signal, the first shielding unit disabling, and the first light source group turning on in response to the first enabling signal to generate the first light occur, the first and second display zones show the image based on the first light, but the first pixels of the third display zone does not show the first right eye image to the left eye of the viewer and the second pixels of the third display zone does not show the first left eye image to the right eye of the viewer due to the second light source group not generating the second light, and
    when all conditions of the first display zone receiving the first data voltage signal, the second display zone and the third display zone receiving the second data voltage signal, the second shielding unit enabling in response to the second shielding signal, the first shielding unit disabling, and the second light source group turning on in response to the second enabling signal to generate the second light occur, the second and third display zones show the image based on the second light, but the first pixels of the first display zone does not show the first light eye image to the left eye of the viewer and the second pixels of the first display zone does not show the first left eye image to the right eye of the viewer due to the first light source group not generating the first light.

2. The stereoscopic display of claim 1, wherein a frequency of the first shielding signal or the second shielding signal equals to one-half of a scan frequency of the stereoscopic display.

3. The stereoscopic display of claim 1, wherein the first and second light source groups comprise light emitting diodes or cold cathode fluorescent lamps.

4. The stereoscopic display of claim 1 further comprising:
    a first polarization plate for outputting the first or second light complying with a first polarizing direction; and
    a second polarization plate for polarizing the first or second light from the first polarization plate to a second polarizing direction which is different from the first polarizing direction.

5. The stereoscopic display of claim 2, wherein a frequency of the first enabling signal or the second enabling signal equals to one-half of the scan frequency of the stereoscopic display.

6. The stereoscopic display of claim 4, wherein the first polarizing direction is perpendicular to the second polarizing direction.

7. The stereoscopic display of claim 6 further comprising a third polarization plate, the barrier disposed between the second and third polarization plates, the third polarization plate for polarizing the first or second light from the second polarization plate to a third polarizing direction which is different from the second polarizing direction.

8. The stereoscopic display of claim 7, wherein the second polarizing direction is perpendicular to the third polarizing direction.

9. A method of driving a display to show a three dimension image to an viewer, the display comprising a display unit and a barrier, the display unit comprising a first display zone and a second display zone, the first display zone and the second display zone respectively comprises a plurality of first pixels and a plurality of second pixels, the barrier comprising a first shielding unit and a second shielding unit, the method comprising:

providing a first light source group for generating first light and a second light source group for generating second light;

when all conditions of the first display zone receiving the first data voltage signal, the second display zone receiving the second data voltage signal, the first shielding unit enabling in response to a first shielding signal, the second shielding unit disabling, and the first light source group turning on to generate the first light occur, the first pixels and the second pixels of the first display zone respectively providing a first right eye image to a right eye of the viewer and a first left eye image to a left eye of the viewer in response to the first data voltage signal based on the first light, and preventing the first pixels of the second display zone to provide a second left eye image to the right eye of the viewer and preventing the second pixels of the second display zone to provide a second right eye image to the left eye of the viewer by the second light source group turning off;

when all conditions of the first display zone receiving the second data voltage signal, the second display zone receiving the first data voltage signal, the first shielding unit enabling in response to the first shielding signal, the second shielding unit disabling, and the second light source group turning on to generate the second light occur, the first pixels and the second pixels of the second display zone respectively providing the first right eye image to the right eye of the viewer and the first left eye image to the left eye of the viewer in response to the first data voltage signal based on the second light, preventing the first pixels of the first display zone to provide the second left eye image to the right eye of the viewer and the second pixels of the first display zone to provide the second right eye image to the left eye of the viewer by the second light source group turning off;

when all conditions of the first display zone receiving the second data voltage signal, the second display zone receiving the first data voltage signal, the second shielding unit enabling in response to a second shielding signal, the first shielding unit disabling, and the first light source group turning on to generate the first light occur, the first pixels and the second pixels of the first display zone respectively providing the second left eye image to the left eye of the viewer and the second right eye image to the right eye of the viewer in response to the second data voltage signal based on the first light, preventing the first pixels of the second display zone to provide the first right eye image to the left eye of the viewer and preventing the second pixels of the second display zone to provide the first left eye image to the right eye of the viewer by the second light source group turning off; and when all conditions of the first display zone receiving the first data voltage signal, the second display zone receiving the second data voltage signal, the second shielding unit enabling in response to the second shielding signal, the first shielding unit disabling, and the second light source group turning on in response to the second enabling signal to generate the second light occur, the first pixels and the second pixels of the second display zone respectively providing the second left eye image to the left eye of the viewer and the second right eye image to the right eye of the viewer in response to the second data voltage signal based on the second light, preventing the first pixels of the first display zone to provide the first right eye image to the left eye of the viewer and preventing the second pixels of the first display zone to provide the first left eye image to the right eye of the viewer by the first light source group turning off.

10. The method of claim 9, further comprising: polarizing the first or second light complying with a first polarizing direction.

11. The method of claim 10, further comprising: polarizing the polarized first or second light to a second polarizing direction which is different from the first polarizing direction.

12. The method of claim 11, wherein the first polarizing direction is perpendicular to the second polarizing direction.

13. A stereoscopic display for showing a three dimension image to a viewer, the stereoscopic display comprising:

a first light source group for generating first light in response to a first enabling signal;

a second light source group for generating second light in response to a second enabling signal;

a display unit comprising a first display zone, a second display zone, and a third display zone, each display zone for showing an image in response to a first data voltage signal or a second data voltage signal, based on the first light or the second light; and a barrier comprising a first shielding unit and a second shielding unit, the first shielding unit enabling in response to a first shielding signal and the second shielding unit enabling in response to a second shielding signal, wherein the first display zone, the second display zone, and the third display zone respectively comprises a plurality of first pixels and a plurality of second pixels;

and the first pixels and the second pixels are configured to respectively provide a first right eye image to a right eye of the viewer and a first left eye image to a left eye of the viewer when the first shielding unit enables and the second shielding unit disables in response to the first data voltage signal;

and the first pixels and the second pixels are configured to respectively provide a second left eye image to the left eye of the viewer and a second right eye image to the right eye of the viewer when the first shielding unit disables, and the second shielding unit enables in response to the second data voltage signal;

wherein when all conditions of the first display zone and the second display zone receiving the first data voltage signal, the third display zone receiving the second data voltage signal, the first shielding unit enabling in response to the first shielding signal, the second shielding unit disabling, the first light source group turning on in response to the first enabling signal to generate the first light, and the second light source group turning off occur, the first and second display zones show the image based on the first light, the first pixels of the third display zone does not provide the second left eye image to the right eye of the viewer and the second pixels of the third display zone does not provide the second right eye image to the left eye of the viewer by the second light source group turning off, when all conditions of the first display zone and the second display zone receiving the second data voltage signal, the third display zone receiving the first data voltage signal, the second shielding unit enabling in response to the second shielding signal, the first shielding unit disabling, the first light source group turning on in response to the first enabling signal to generate the first light, and the second light source group turning off occur, the first and second display zones show the image based on the first light, the first pixels of the third display zone does not provide the first right eye image to the left eye of the viewer and the second pixels of the third display zone does not provide the first left eye image to the right eye of the viewer by the second light source group turning off.

14. The stereoscopic display of claim 13, wherein when all conditions of the first display zone receiving the second data voltage signal, the second display zone and the third display zone receiving the first data voltage signal, the first shielding unit enabling in response to the first shielding signal, and the second light source group turning on in response to the second enabling signal to generate the second light, and the first light source group turning off occur, the second and third display zones show the image based on the second light; and when all conditions of the first display zone receiving the first data voltage signal, the second display zone and the third display zone receiving the second data voltage signal, the second shielding unit enabling in response to the second shielding signal, the second light source group turning on in response to the second enabling signal to generate the second light, and the first light source group turning off occur, the second and third display zones show the image based on the second light.

15. The stereoscopic display of claim 13, wherein a frequency of the first shielding signal or the second shielding signal or the first enabling signal or the second enabling signal equals to one-half of a scan frequency of the stereoscopic display.

16. The stereoscopic display of claim 14 further comprising:
a first polarization plate for outputting the first or second light complying with a first polarizing direction; and
a second polarization plate for polarizing the first or second light from the first polarization plate to a second polarizing direction which is different from the first polarizing direction.

17. The stereoscopic display of claim 16, wherein the first polarizing direction is perpendicular to the second polarizing direction.

18. The stereoscopic display of claim 17 further comprising a third polarization plate, the barrier disposed between the second and third polarization plates, the third polarization plate for polarizing the first or second light from the second polarization plate to a third polarizing direction which is different from the second polarizing direction.

19. The stereoscopic display of claim 18, wherein the second polarizing direction is perpendicular to the third polarizing direction.

* * * * *